Figure 1B:
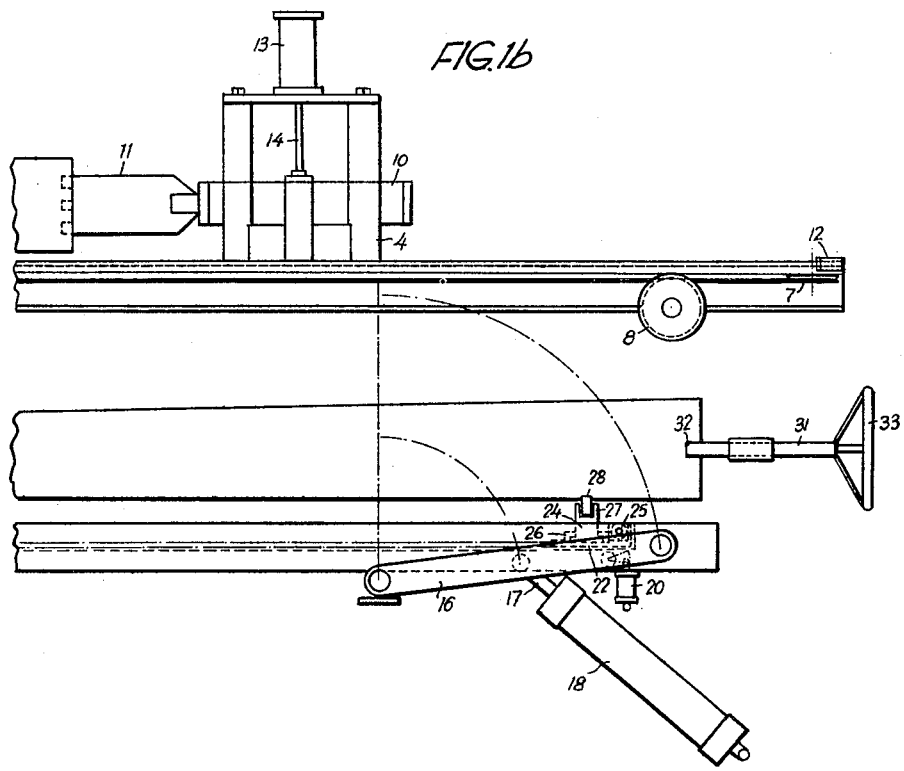

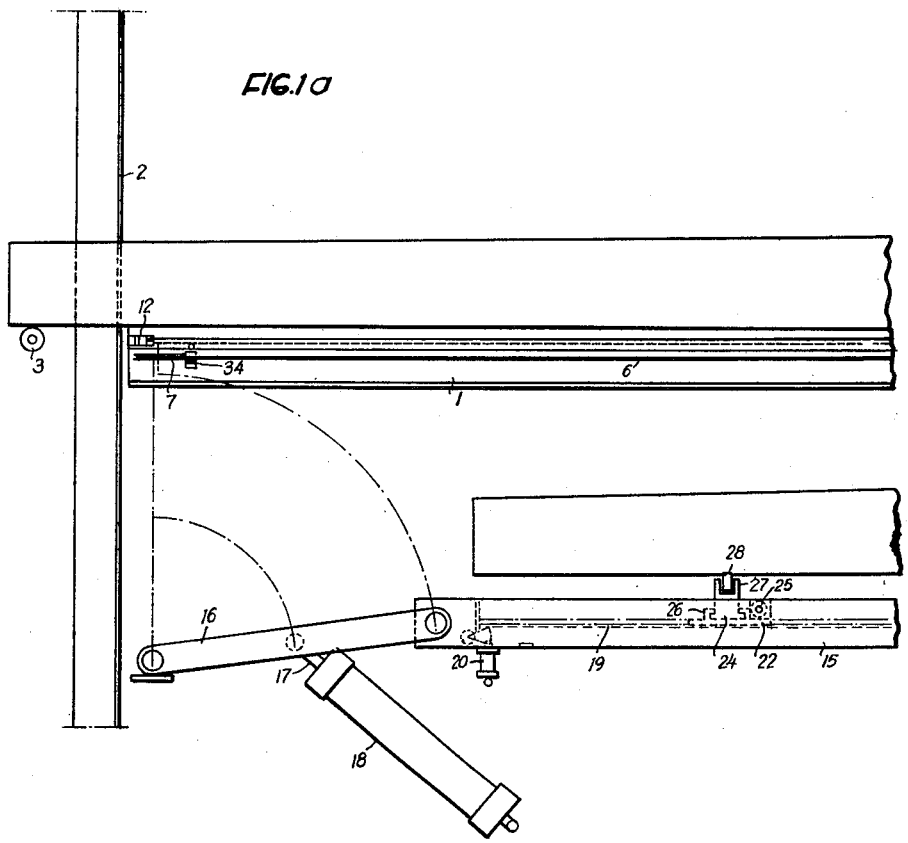

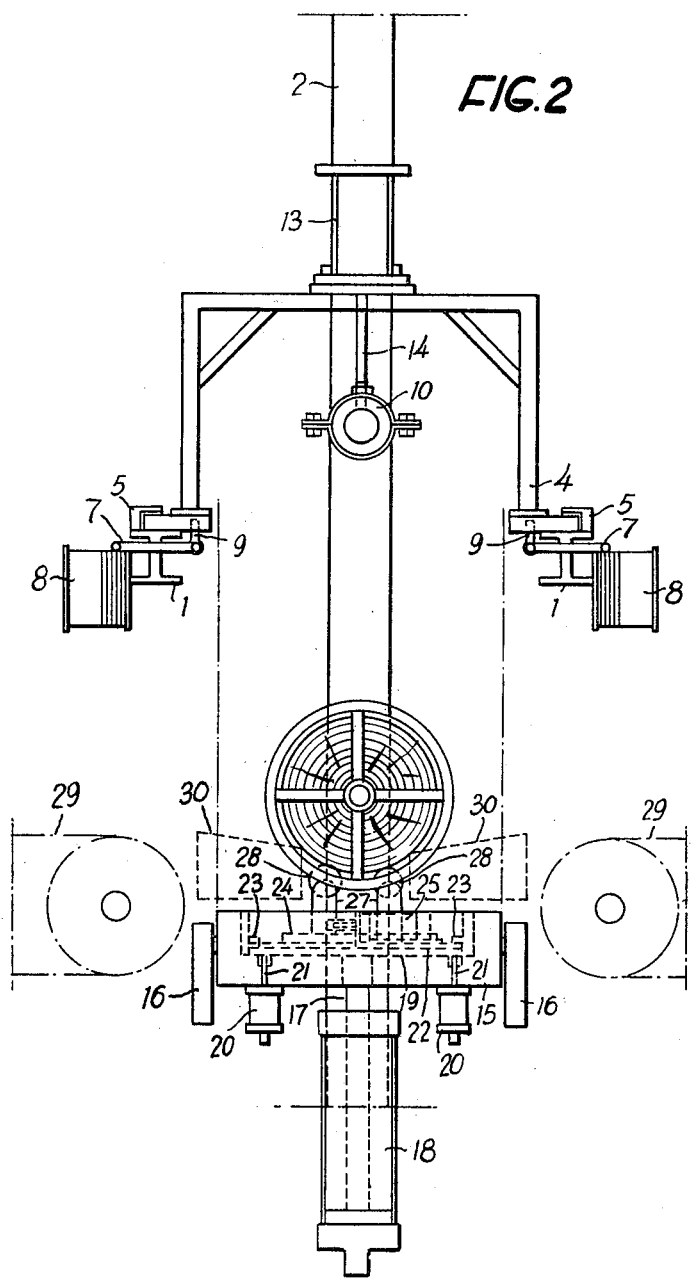

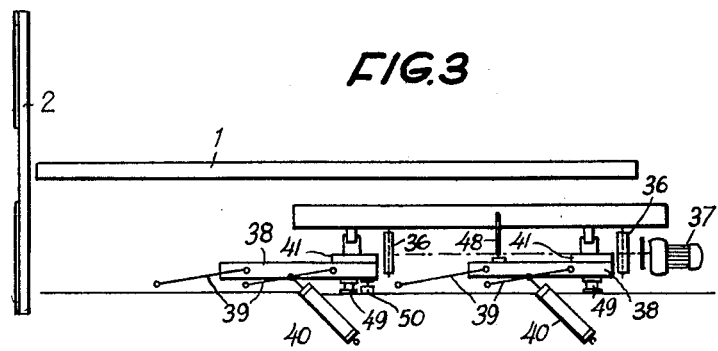
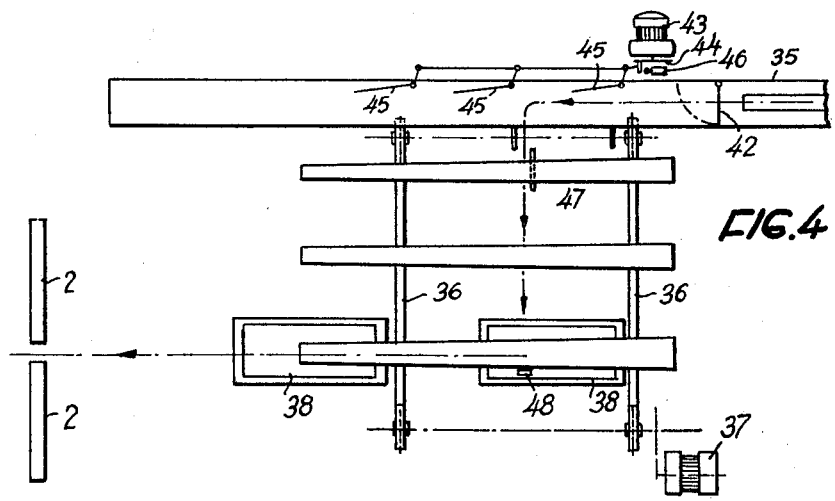

United States Patent Office 3,190,323
Patented June 22, 1965

1

3,190,323
MECHANISM FOR ALIGNING TIMBER
FOR SAWING
Nils Thure Georg Johansson, Bruzaholm, Sweden
Filed Mar. 28, 1963, Ser. No. 268,637
1 Claim. (Cl. 143—92)

This invention relates to a mechanism for aligning timber for sawing in a saw machine having a vertical cutting edge, said mechanism comprising a log feed device and a support adapted to align the log laterally relative to a vertical plane located in the sawing direction. For sawing or cutting timber into blocks or large-size wood for instance in a frame saw, band saw or the like it was hitherto customary to roll the log onto a special feed device consisting of carriages on which the log is clamped and which thereupon are moved toward the saw machine. In this operation the rear larger portion of the log has first to be clamped and locked in the log carriage whereupon the log by means of a log turner is turned round to correct position with regard to bends, knots and the like. Finally the log has to be moved laterally so as to be brought in alignment with the sawing line. After the front carriage while the log is being sawed, has arrived at the frame or band saw and the work to be sawed has been fastened on the opposite side to a corresponding rear carriage the gripping device at the rear end of the log is released whereupon the carriage automatically returns to receive the next log. During all of the time required for sawing the log as well as during the time required for the log carriage to return to the initial position nothing can be done to put the next log in readiness. The object of this invention is to provide a mechanism by means of which the time required for sawing a log and for returning the log carriage can be utilized for feeding and aligning the next log. In accordance with the invention this object is attained due to the fact that the log is aligned by the support in a position which is remote from the feed position and unobstructing the sawing of a log in the feed device and that the support is displaceable from said remote position to the feed position while maintaining the supported log in unchanged aligned position relative to said plane, and vice versa. Consequently, in accordance with the inventive idea, the log is aligned in correct position in advance while the preceding log is sawed, and after the sawing operation is finished the log is moved to the feed device in correct position for sawing.

Different embodiments of the invention are described more closely hereinbelow with reference to the annexed drawing in which FIGS. 1a and 1b are a diagrammatic lateral elevation of a saw bench for a double-blade band saw in combination with a log prealigning mechanism, FIG. 2 is an elevation of this mechanism as viewed in the direction of feed of the log toward the saw frame, FIG. 3 is a lateral elevation of another embodiment and FIG. 4 is a top view of the mechanism shown in FIG. 3.

The saw machine according to the invention as illustrated in FIGS. 1a, 1b and 2 comprises a stationary longitudinally extending horizontal saw table in the form of a frame having two horizontal beams 1, 1 which on either side of the sawing line extend in the direction of feed and are welded together by means of cross beams (not shown). The frame is stationarily supported by a structure not shown in the drawing. Located at one

2 end of the frame to the left in FIG. 1a is a double-blade band saw 2 which is only diagrammatically illustrated in the drawing. Located on the other side of the band saw is a discharge device represented by a roller 3 extending transversely of the sawing line. A slide 4 is displaceable along the stationary frame 1, 1 in guides 5, 5 one on each longitudinal beam 1. An endless cable 6 on either side of the frame extends around the cable pulleys 7, 7 provided at the ends of the beams 1. Each cable 6 is wound on a cable drum 8, 8 on either side of the frame. By means of a clutch not shown, for instance a friction clutch, the cable drums can be connected to a prime mover, not shown, such as an electric motor. By means of a clamp 9 each cable 6 is secured to the slide 4 which consequently can be pulled along the beams 1. Provided on the slide 4 in the sawing line is a log holder 10 consisting of a toothed striking member 11 which by means of an air hammer is driven into the end of a log and, if required, withdrawn from the end. At both ends of the beams there are provided limit switches 12 which are actuated by the slide 4 to stop the movement thereof. The slide 4 is build in the form of a door and has mounted on its upper part an air cylinder 13 the piston rod 14 of which is secured to the log holder 10 which consequently can be raised and lowered.

Disposed below the saw table is a mechanism by means of which a log to be sawed can be prealigned relative to the sawing line. The mechanism comprises a frame 15 which is movable in a vertical plane and extends parallel to and right below the upper stationary frame 1, 1. The movable frame 15 which is somewhat shorter than the stationary frame 1, 1 has at each end and on either side an articulated link 16 which in turn is articulated to a foundation or the like. Each pair of links has pivotally connected thereto between the pivots of the links the piston rod 17 of a preferably air-operated lifting cylinder 18 the other end of which is articulated to the foundation. The links 16 and lifting cylinders 18 are dimensioned such that when the links 16 assume a substantially horizontal position and then are swung upwards to a vertical position the movable frame 15 will be translationally moved upwards to a position substantially on a level with the stationary frame 1, 1.

Within the translational frame 15 an inner frame 19 is adapted to be raised and lowered through about two inches and a half by means of lifting cylinders 20 which are pairwise disposed at each end of the frame 15 and the piston rods 21 which are secured to the inner frame 19. In the inner frame 19 there are two slides 22 horizontally displaceable longitudinally of the frame, that is, in the sawing direction, and guides 23 for the slides are provided on the inner sides of the inner frame 19. Each of the slides 22 displaceable in the sawing direction has mounted thereon a transverse slide 24 which by means of an air-operated cylinder 25 is displaceable in guides 26 transversely of the longitudinally movable slide 22. Each transverse slide 24 has two vertical brackets 27 on either side of the sawing line. The upper parts of the brackets have mounted therein a roller 28 the axis of which is parallel to the sawing line. These rollers 28 are supporting rollers for a log to be sawed.

Located on one or both sides of the translational frame 15 is the end point of a lateral conveyor 29 on which a log can be fed inwards laterally over folding arms 30 down onto the rollers 28. At the end of the frame 15 remote from the band saw there may be provided a log turner 31 provided with lugs 32 for engaging the log and with a hand wheel 33 by means of which the log can be turned on the rollers 28.

Alignment of a log in the above described mechanism is carried out in the following manner. With the translational frame 15 and the inner frame 19 thereof in their lowermost positions a log is fed by the lateral conveyor 29 over the inwardly directed arms 30 and lands on the rollers 28 of the two log slides 24. Thereupon the inner frame 19 is lifted through about two inches and a half by means of the lifting cylinders 20 disposed on the outer frame 15. If required, the log can now be readily turned by means of the log turner 31 which is preferably air-operated and grips the end of the log. Then the log has to be centered, that is, placed in correct position relative to the sawing line which can be done with the frame 15 either in the lowermost position or in a higher position. The centering operation is performed by means of the two servo cylinders 25 by means of which the log can be moved laterally and horizontally while resting on the transverse slides 24 which are displaceable on the longitudinal slides 22. After lateral alignment of the log the frame 15 is translated by means of the two lifting cylinders 18 so that the log will be located about three inches and a fourth above the stationary frame 1, 1. Now the striking member 11 of the log holder 10 is forced into the end of the log which then is ready to be sawed. By means of the clutch the driving motor is connected to the cable drums 8 which imparts movement to the cables 6 which move the slide 4 toward the saw together with the log resting on the slides 22 in the frame 15. As soon as the log slide at the end of the frame 1 closest to the saw comes into contact with a release valve 34 this valve allows passage of compressed air out of the lifting cylinders 18 resulting in that the frame 15 will be moved to its lowermost position. Meanwhile the leading end of the log has arrived at the supporting roller 3 of the discharge device for the sawed log and consequently is now resting only on this roller and in the log holder 10 on the slide 4. The sawing operation is continued while the next log is fed inwards onto the frame 15 for alignment. When the log is completely sawed the slide 4 has arrived at the limit switch 12 which stops the fed movement. Now the air hammer is operated to release the log holder 10 from the log, the direction of movement of the cables 6 is reversed, and the slide 4 returns to its initial position in which it is automatically stopped by the limit switch at the other end of the frame 1, 1 and is ready to receive the next log which meanwhile has been finally aligned in the frame 15.

Due to the fact that the log holder 10 is suspended on the slide 4 it can be lifted through about two feet and a half by means of the lifting cylinder 13 while the slide 4 returns to its initial position. As a result thereof the underlying frame 15 together with a log lying thereon can be translated upwards to the sawing position already during the return movement of the slide 4, whereby to save time. It is even possible to center the log lying on the frame 15 while this frame is assuming its upper or sawing position and while the slide 4 is returning. Due to this fact further time is saved, and the operator can remain at his place and observe the sawing operation even during alignment of the log.

In the embodiment illustrated in FIGS. 3 and 4 there is provided an automatic feed device for the logs which is different from the feed device shown in FIGS. 1 and 2. This automatic feed device consists of a motor driven timber windlass which by way of example is provided with a log lift way and is located in parallel relation to the saw table and slightly laterally thereof. Extending laterally from the windlass toward the aligning mechanism is a conveyor 36 consisting of two parallel endless chains which are driven by a motor 37 including a change gear. The lateral conveyor 36 extends transversely through the log aligning mechanism which for this reason is divided into two frames 38 which can be translated in a vertical plane by means of arms 39 which are driven by pneumatic air cylinders 40 and provided each with a log slide 41.

At some distance ahead of the lateral conveyor 36 the timber windlass 35 is provided with a pivoted arm 42 which is loaded by a spring or weight and adapted to be actuated by passing logs so as to operate a switch which starts a motor 43 including a change gear and provided with a crank disc 44 connected to three discarding arms 45. When a log arrives at the windlass 35 the front end thereof swings the arm 42 outwards which arm after having passed the trailing end is swung back and starts the motor 43 for the discarding arms 45 resulting in that the logs will be thrown down from the windlass 35 to the lateral conveyor 36. Upon one revolution of the crank disc 44 of the discarding arms 45 a positioner switch 46 stops the driving motor 43 of the disc. Now the log is laying on the lateral conveyor 36. In order to provide for an appropriate distance between the logs on the lateral conveyor such as a distance of 3 to 4 feet, there is provided a switch 47 having a comparatively long operating arm which is actuated by the log during the movement thereof on the lateral conveyor and temporarily stops the driving motor of the windlass 35. After the logs have been moved to the alignment mechanism by means of the lateral conveyor the driving motor 37 of the lateral conveyor is stopped by a limit switch 48 which is released by the log. At the same time the pneumatic impulse member is engaged to admit air via a remote valve to two lifting cylinders 49 which lift the two log slides 41 so that they are clear of the lateral conveyor 36. The log is then aligned and moved upwards to the sawing position in the same manner as described with reference to the mechanism shown in FIGS. 1a, 1b and 2.

After the alignment mechanism has delivered the log during the sawing operation and returns to its initial position an electric impulse emitter 50 starts the driving motor 37 of the lateral conveyor about one inch and a half ahead of the final position so that a next following log can be fed to the alignment mechanism.

The mechanism for prealignment of timber for sawing described above with reference to the drawing is not limited to the embodiments illustrated, but may be varied as to construction and details within the scope of the invention. For instance it is conceivable to dispose the alignment mechanism in another way relative to the feed device. For example it is conceivable that the alignment mechanism receives the logs in a position right above the feed device in which case the feed slide and the log holder have to be constructed so as not to obstruct the lowering movement of the log to the feed device while the slide is moved back to the initial position. It is also conceivable to place the alignment mechanism laterally of the feed device, for instance in the same horizontal plane as the feed device, in which case the log is aligned with a fictive sawing line and then horizontally translated to the feed device.

What is claimed is:

Saw machine comprising a foundation, a stationary, longitudinally extending horizontal saw table supported on said foundation, a vertically cutting saw supported at one end of said table, a log holder displaceable along said saw table, means for moving said log holder back and forth along said table, means for raising and lowering said log holder with respect to said table, a log pre-aligning mechanism disposed below said table, said pre-aligning mechanism comprising an outer rectangular frame positioned below and parallel to said table, said outer frame being shorter than said table, a pivotally connected link extending from said foundation to each corner of said outer frame, said links being of such length that when raised to their vertical positions they will raise a log supported by said outer frame substantially into alinement with said log holder, means for raising and lowering said links from their horizontal to their vertical positions, an inner frame supported within said outer frame, means connecting said inner frame to said outer frame for raising and lowering said inner frame with respect to said outer frame, spaced apart longitudinally displaceable slides mounted on said inner frame, a transversely displaceable slide mounted on each of said longitudinally displaceable slides, means for moving said transversely displaceable slides transversely of said longitudinally displaceable slides and means on said transversely displaceable slides for supporting a log to be sawed, said last named means comprising two spaced apart rollers.

References Cited by the Examiner

UNITED STATES PATENTS 2,803,272   8/57   Crosby _____ 143—92 XR
3,037,538   6/62   Graham.

FOREIGN PATENTS 942,592   5/56   Germany.

WILLIAM W. DYER, JR., *Primary Examiner.*
DONALD R. SCHRAN, *Examiner.*